Oct. 18, 1949.　　　　W. J. COTTON　　　　2,485,479
ELECTROCHEMICAL PRODUCTION OF NITROGEN OXIDE
Filed Oct. 8, 1948　　　　　　　　　　　　3 Sheets-Sheet 1
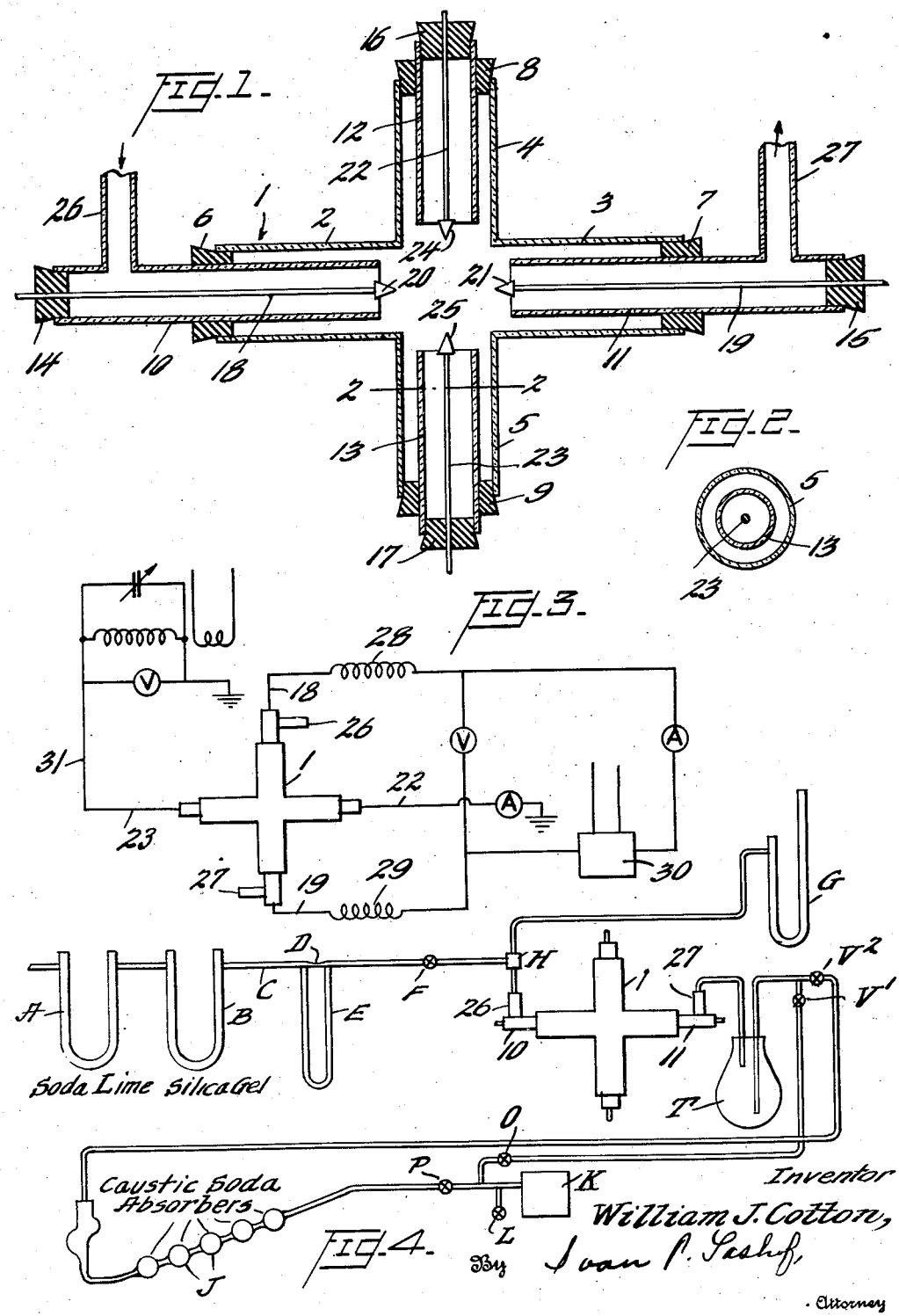
Inventor
William J. Cotton,
By Ivan P. Seshif,
Attorney Oct. 18, 1949. W. J. COTTON 2,485,479
ELECTROCHEMICAL PRODUCTION OF NITROGEN OXIDE
Filed Oct. 8, 1948 3 Sheets-Sheet 2
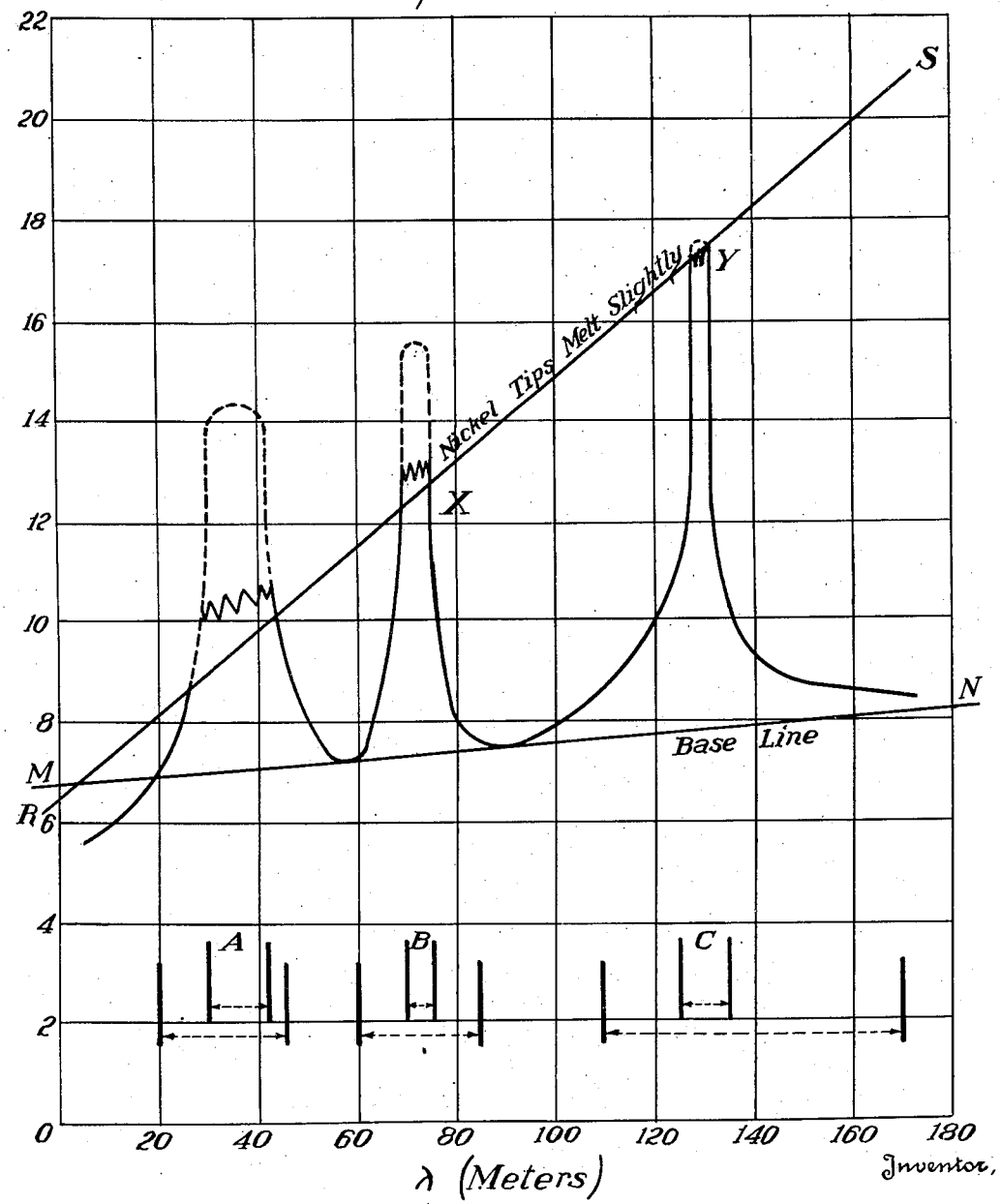
Inventor,
William J. Cotton
By [signature]
ATTORNEY Oct. 18, 1949.  W. J. COTTON  2,485,479
ELECTROCHEMICAL PRODUCTION OF NITROGEN OXIDE
Filed Oct. 8, 1948  3 Sheets-Sheet 3
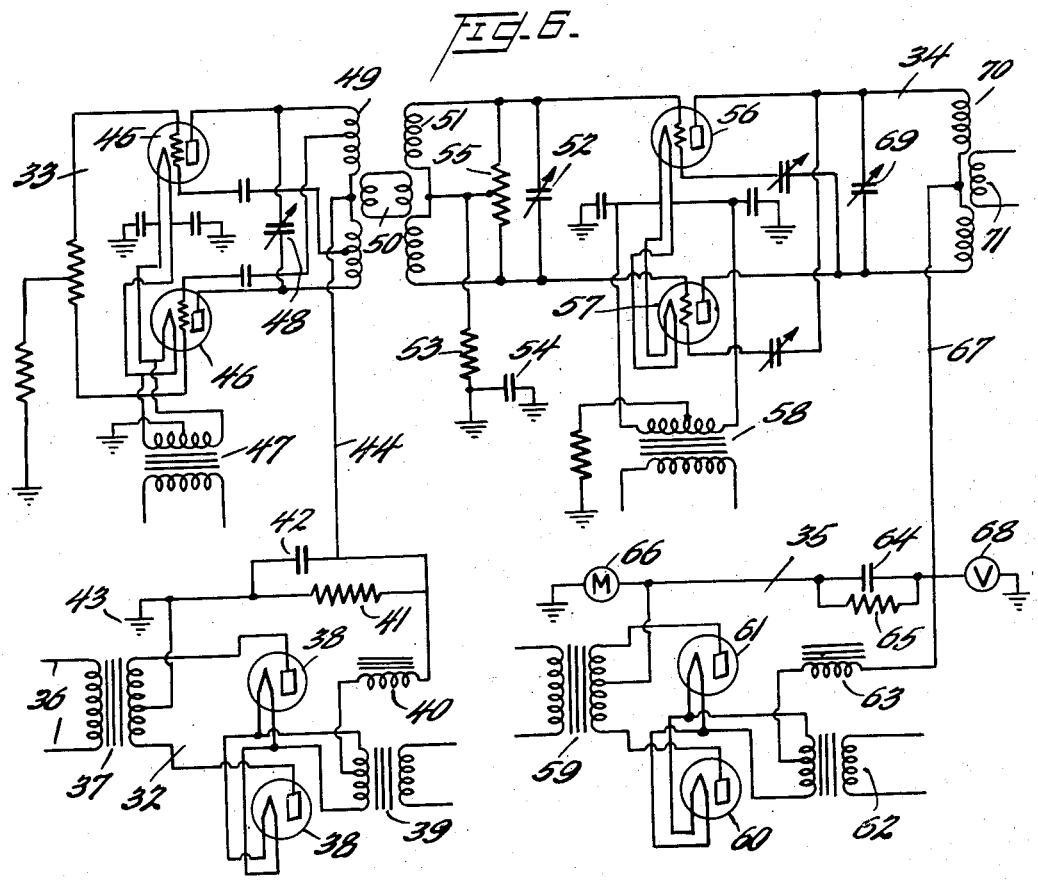
Inventor
William J. Cotton,
By Ivan P. Tashof
Attorney Patented Oct. 18, 1949

2,485,479

UNITED STATES PATENT OFFICE 2,485,479

ELECTROCHEMICAL PRODUCTION OF NITROGEN OXIDE

William J. Cotton, Butler, Pa., assignor to Koppers Company, Inc., Pittsburgh, Pa., a corporation of Delaware Application October 8, 1948, Serial No. 53,520

16 Claims. (Cl. 204—179)

This invention in one of its forms relates to the production of nitrogen oxide by subjecting a gaseous medium consisting principally of nitrogen gas and oxygen gas to the action of crossed electrical discharges generated by separate crossed cyclic electrical energies. The invention is also directed to the production of nitrogen oxide by subjecting a gaseous medium, consisting principally of nitrogen gas and oxygen gas, to the action of only a high frequency discharge which is a critical reaction frequency for the oxidation of nitrogen, said oxidation of the nitrogen being carried out in the presence of metallic electrodes provided with a copper-containing terminal in which copper predominates, or a nickel-containing terminal in which nickel predominates, it being pointed out that nickel and copper have critical electrode frequencies between the frequency ranges of 10 mc. (30 meters) and 7.14 mc. (42 meters) and more specifically between about 8.82 mc. (34 meters) and about 7.50 mc. (40 meters); and also within the critical gas reaction frequency range of between about 4.29 mc. (70 meters) and about 4.00 mc. (75 meters). The critical electrode frequencies for copper and nickel and their relationship to certain critical gas reaction frequencies for the oxidation of nitrogen are pointed out in applicant's copending application, Serial No. 779,561, filed October 13, 1947.

One of the primary objects of the present invention is to electrochemically react gaseous material of the character above set forth to produce therefrom, in the presence of crossed cyclic electrical energies, optimum yields of nitrogen oxide. Other supplemental and auxiliary objects will appear as the present invention is disclosed.

In one form of the present invention, a method is provided of producing nitrogen oxide, said method comprising introducing a nitrogen-and-oxygen-containing gaseous material into a reactor provided with crossed electrodes and subjecting said material to the action of a plurality of crossed electrical discharges, each of which is generated by cyclic electrical energy; said cyclic electrical energy may be generated by an alternating current or by pulsating direct current. In other words, means other than an alternating current are now known to provide a pulsating or cyclic current characterized by a frequency, and it is desired, by the terminology hereinused, to include all means for generating a cyclic or pulsating electrical discharge.

It is a special object of the present invention to produce nitrogen oxide by subjecting a nitrogen-and-oxygen-containing gaseous medium adapted to be transformed into nitrogen oxide to the action of crossed discharges generated by crossed electrodes where one pair of electrodes is provided with electrode terminals comprising nickel or a nickel alloy, the predominating constituent of which is nickel, and the other pair of electrodes, and, where a common ground is used, the other electrode, is provided with a copper-containing terminal or terminals in which copper predominates, as exemplified by copper, bronze, brass, and copper-lithium alloys, the discharge between the copper-containing terminals being preferably a low frequency discharge, and that between the nickel or nickel alloy terminals a high frequency discharge, the scope of these latter terms being hereinafter particularly set forth. Brass electrode terminals crossing the nickel electrode terminals have given particularly satisfactory results.

When low frequency 60 cycle energy is crossed with high frequency, using the combination of nickel and brass tips heretofore described, it has been discovered that certain high frequency wave lengths produce peak yields of electrically transformed products.

It is also within the province of the present invention to produce the crossed discharges wherein each of the crossed electrical discharges is generated by a separate cyclic electrical energy having a wave length producing peak yields of the electrically transformed products.

In one form of the invention, the crossed electrical discharges are generated by cyclic electrical energies of substantially different frequencies; and in one variation thereof one of said frequencies is a peak frequency which produces peak yields of the electrically transformed product.

The invention in one of its forms is directed to a method of producing nitrogen oxide comprising introducing a gaseous medium consisting principally of nitrogen gas and oxygen gas into a gas discharge apparatus having an assemblage of at least three separately spaced electrodes provided with metallic electrode terminals selected from the group consisting of a metal-containing material in which copper predominates and a metal-containing material in which nickel predominates, said metal-containing electrode materials being simultaneously used, at least two of said electrode terminals being "hot" or high potential electrode terminals, said assemblage of electrode terminals being positioned to have a cyclic electrical discharge pass between a pair thereof, one terminal of said pair being a "cold" or low potential electrode terminal, subjecting said gaseous medium simultaneously to a plurality of separate cyclic electrical discharges, each of which emanates from a separate "hot" or high potential electrode terminal and intersects to form a composite discharge, one of said discharges being generated by cyclic electrical energy equivalent to that present in a sinusoidal wave within a wave band selected from a group of wave band widths of about 30 to about 40 or 42 meters; and about 70 to about 75 meters.

In one form of the present invention a gaseous nitrogen - and - oxygen - containing medium adapted to produce nitrogen oxide upon treatment with a cyclic electrical discharge is introduced into a gas discharge apparatus provided with electrodes comprising a metal-containing material in which nickel predominates or in which copper predominates. Thereafter said gaseous medium is subjected, in the presence of the nickel base or the copper base electrodes, to a cyclic electrical discharge generated by a cyclic electrical energy quantum equivalent to a sinusoidal frequency between about 8.82 mc. (34 meters) and about 7.50 mc. (40 meters), this being an intermediate wave band range at which increased yields are obtained, as is clear from an inspection of Fig. 5, said increased yields being set forth in co-pending applications Serial No. 489,828, now abandoned, filed June 5, 1943, and Serial No. 553,426, filed September 9, 1944, the present application being a continuation-in-part of each of said applications and of application Serial No. 779,561, filed October 13, 1947. Stated somewhat differently, an increase in yield is obtained by operating with a particular wave length within the wave band having limits between about 34 and 40 meters. The magnitude of the yield depends not only upon the particular wave length used but also is a result of this wave length and the particular electrode material used, as, for example, nickel or copper. Similarly, increased yield is obtained when using a frequency within the critical gas reaction frequency wave band of about 70 meters to 75 meters in the presence of copper-containing or nickel containing metallic electrodes, high frequency energy alone being employed.

In the specific form of the present invention, there is provided a method of producing nitrogen oxides comprising introducing into a reactor provided with crossed electrodes, one pair of which consist of nickel electrodes and the other pair of brass electrodes, a gaseous nitrogen-and-oxygen-containing medium adapted to produce nitrogen oxide upon treatment with crossed electrical discharges, and thereafter subjecting said medium to the action of a plurality of crossed electrical discharges, each of which is separately generated by electrically developed cyclic energy, the generation of said crossed discharges occurring in the presence of nickel and brass electrodes as above described, whereby the yield of nitric oxide is greatly increased.

While one of the said crossed discharges may be generated by a low frequency current, as, for example, 10 to 50,000 cycles and the other generated by a high frequency current, as, for example, that of radio frequency or any cyclic current having a frequency above about 250,000 cycles, it is preferred that each of said electrical discharges be generated by a separate cyclic electrical energy having a wave length capable of producing peak yield of nitrogen oxide in the presence of nickel or brass electrodes above described. In other words, each frequency when used by itself is capable of producing peak yields, and when crossed produce a peak yield greater than that produced by either frequency used by itself to produce various chemical entities including nitrogen oxide.

It has been discovered that when a nitrogen-and-oxygen-containing material is subjected to the action of a plurality of crossed discharges, one of said discharges generated by electrical energy of a sinusoidal frequency within the wave band varying from about 20 to about 45 meters and, more specifically, 30 to 42 meters, peak yields of nitric oxide are produced. It has been further discovered that another band similarly producing peak yields lies between the limits of 60 to 85 meters and, more specifically, 70 to 75 meters.

The present invention will be disclosed in connection with the accompanying drawings, in which Fig. 1 is a cross-sectional view of a reactor apparatus capable of generating crossed discharges of the character herein described;

Fig. 2 is a transverse cross-sectional view taken on the line 2—2 of Fig. 1;

Fig. 3 diagrammatically sets forth the connection of the high frequency electrodes to the generator and tank circuits and the low frequency electrodes to the source of low frequency energy;

Fig. 4 is a diagrammatic representation of an apparatus for drying the air prior to its introduction into the reactor, and for absorbing the nitric oxide content of the exit reaction gases;

Fig. 5 is a graph depicting the results obtained when using the reactor set forth in Fig. 1. The abscissa indicates the wave length, lambda, in meters and the ordinate indicates the yield in grams of nitric oxide calculated as grams of nitric acid per kilowatt hour;

Fig. 6 sets forth the hook-up of the high frequency generator unit used for producing the high frequency energy supplied to the tank circuit which connects the generator with the reactor; and Fig. 7 sets forth the tank circuit used in conveying electrical energy from the generator to the reactor.

The reactor apparatus shown in Fig. 1 comprises a hollow reactor vessel 1 made of non-conducting or insulating material such as a ceramic material, including glass, and preferably a high melting glass as exemplified by a borosilicate glass. The reactor is provided with what are herein termed "leg members" 2, 3, 4 and 5, provided respectively with apertured insulating closure members 6, 7, 8 and 9, each of said closure members having mounted therein sheath members 10, 11, 12 and 13 respectively. Each of said sheath members at their respective outer ends are closed by apertured closure members 14, 15, 16 and 17 respectively. Passing through the sheath members 10 and 11 and mounted in the end closures 14 and 15 respectively are low frequency electrodes 18 and 19 provided with brass electrode terminals 20 and 21, said terminals being preferably in the form of pointed members, as shown.

Very satisfactory results may be obtained by having the electrodes 18 and 19 and the terminals 20 and 21 integral with each other and made of brass wire, or in the form of a brass rod that have been pointed at their inner ends. However, it is within the province of the present invention to make the electrode terminals of any of the electrodes herein set forth removable in order to thereby provide for the replacement of burnt-out electrode terminals with new terminals. Passing through the sheath members 12 and 13 and mounted in the closure members 8 and 9 respectively are high frequency electrodes 22 and 23, said electrodes being provided with nickel terminal members 24 and 25 respectively, said electrode terminals or tip members being preferably pointed. Each high frequency electrode, together with its accompanying electrode terminal, is preferably in the form of an integral nickel wire or rod, pointed at their inner ends to thereby provide the nickel electrode point. The reactor is provided with an inlet member 26 and an exit member 27.

The electrode 23 serves as a hot electrode in the tank circuit herein set forth, while electrode 22 passes to ground via a milliammeter, as shown in Fig. 3. The low frequency electrodes 18 and 19 connect with the terminals of a high voltage transformer 30 yielding 60 cycles, and in said circuit a high voltage voltmeter and milliammeter are placed in the usual manner. The high voltage transformer 30 is protected against possible shorts from the high frequency circuit in the reactor by inserting appropriate choke coils 28 and 29 between the low frequency electrodes and their connections to the high voltage low frequency circuit, as shown in Fig. 3.

The high frequency electrode 23 is connected to lead 31, said lead electrode being an integral part of the tank circuit shown in Fig. 3 and, more specifically, in Fig. 7.

The gaseous component to be treated in the reactor set forth in Fig. 1, after being dried in the apparatus set forth in Fig. 4 in the manner hereinafter described, enters the reactor through an inlet member 26, passes through the sheath member 10 around the electrode terminal and through the composite or crossed arc. The reaction product passes through the sheath 11 and leaves the latter by means of the exit conduit 27. The reaction product passes through a medium for extracting its nitric oxide content, the precise method of extraction being hereinafter set forth in connection with the description of Fig. 4.

While, as stated, it is preferred to have the electrode terminals pointed, it is within the province of the present invention to use buttons, nodules, globules, or to have the electrode terminals in any other shape hitherto used in the treatment or electrochemical transformation of chemical products. The sheath members may, under some circumstances, be omitted, but it is highly desirable to retain them in order to force the flow of gaseous medium being subjected to the action of the crossed discharge in and around the electrode terminals. Further, it may be stated that the sheath members function to a substantial extent to protect the outer vessel from the effect of heat which may be produced during the course of the reaction in the reactor. It is preferable that the electrode terminals 20, 21, 24 and 25 project beyond the interior ends of the sheath members in order to avoid undue heat which may induce generation of sodium and other undesirable ions which tend to generate side reactions.

The following is a specific example, identified as Example I, illustrating the production of nitric oxide from atmospheric air using the reactor set forth in Fig. 1, there being produced peak yields of nitric oxide under the specific operating conditions.

The diameter of each leg member of the reactor vessel approximates 32 mm., and the inner sheaths are 23 mm. in diameter. The overall length of the reactor 1 is approximately 10 inches.

In starting the apparatus, the flow of dry air is initiated through the inlet member 26, said air passing through the reactor legs at a rate of approximately 500 cc. per minute under standard conditions. The pressure within the reactor is maintained at approximately 709 mm. mercury pressure. This is but slightly below the atmospheric pressure which was 734 mm. mercury pressure. There is applied to the high frequency electrode terminals 24 and 25 high frequency energy having a potential voltage, before striking, of 2350, said voltage dropping immediately on striking the arc to 800 volts. The sinusoidal high frequency energy is applied at a frequency of 2.27 mc. (132.1 meters). The high frequency gap between electrodes 24 and 25 is 52 mm.; and the low frequency gap between the electrode terminals 20 and 21 is 26 mm. After applying the high frequency energy, there is applied to the low frequency electrodes 18 and 19 a high voltage low frequency current having a frequency of 60 cycles, applied under a potential of approximately 2,000 volts, which immediately drops, upon the striking of the discharge, to approximately 1100 volts, the latter being accompanied by a current of 106 milliamperes.

At the time that the data of Fig. 5 were obtained, a high frequency thermomilliammeter was not available for inclusion in the tank circuit and accordingly the readings of the voltmeter and thermomilliammeter in the power amplifier plate circuit were used as a basis for computing the energy supplied to the composite or crossed discharge as high frequency energy. On this basis, the yields given as ordinates in Fig. 5 were obtained. Obviously, the energy that was assumed as being supplied as determined by these meters is far too high in their absolute amount but relatively correct. Subsequently, when meters became available and the efficiency of energy transfer from power amplifier plate to tank circuit could be determined and this factor applied as a correction factor, it was found that the ordinate yields of Fig. 5 should be multiplied by 1.66. For the purposes of this example, the original experimental data is given in which the watts of energy supplied by the low frequency discharge is 117 watts and by the high frequency discharge, as calculated from the meters on the power amplifier plate circuit, 94 watts, or a total of 211 watts. Using the subsequently determined energy transfer from power amplifier plate circuit to discharge, the actual watts supplied by the high frequency energy was 10 instead of 94. In other words, of the total energy supplied at the discharge approximately 8% was high frequency energy and 92% low frequency energy. The reaction products produced under the above conditions are absorbed in the caustic soda absorbers J of Fig. 4, after having passed through the balloon flask T, wherein the nitric oxide is converted to nitrogen dioxide, as hereinafter set forth in detail. The caustic soda showed an absorption equivalent to 100.8 mg. of nitric acid. This in turn calculated to 17.15 gms. of nitric acid per kilowatt hour and is represented at the point Y in Fig 5. The duration of the experiment was 1.67 minutes.

The following is an additional example, identified as Example II, setting forth the production of nitric oxide from atmospheric air using the reactor set forth in Fig. 1. This example corresponds to the point X on Fig. 5.

In starting the apparatus, the flow of dry air is initiated through the inlet member 26, said air passing through the reactor legs at a velocity of approximately 550 cc. per minute under standard conditions. The pressure within the reactor is maintained at approximately 735 mm. mercury pressure. There is applied to the high frequency electrode terminals 24 and 25 high frequency energy having a potential voltage before striking of 2300 volts, said voltage dropping immediately on striking the arc to 400 volts. As pointed out above, a thermomilliammeter was not available at the time of obtaining this data but subsequent checks indicated that 7 watts of high frequency energy were supplied at the discharge as contrasted with 69 watts to the power amplifier plate circuit. The high frequency energy is applied at a frequency of 3.99 mc. (75.2 meters). The high frequency gap between electrodes 24 and 25 is 19 mm. and the low frequency gap between electrode terminals 20 and 21 is 16 mm. After applying the high frequency energy, there is applied to the low frequency electrodes 18 and 19 a high voltage low frequency current having a frequency of 60 cycles applied under a potential of approximately 2,000 volts, which upon the striking of the discharge immediately drops to about 900 volts, the latter being accompanied by a current of 90 milliamperes. The low frequency energy thus corresponds to a power of 81 watts whereas the high frequency energy supplied to 69 watts as measured on the power amplifier plate circuit meters, but which was estimated subsequently to have been about 7 watts at the discharge. Accordingly, of the total energy supplied to the discharge, approximately 8% is high frequency energy.

The reaction products produced under the above conditions are absorbed by passing first through the balloon flask T for their conversion to nitrogen dioxide and then to the caustic soda absorbers J, as hereinafter set forth in detail. There was indicated for a six minute run a yield of nitric axide calculated as nitric acid of 195.3 mg. which corresponds to a yield of 13.04 gms. of nitric acid per kilowatt hour. This yield appears on Fig. 5 as the point X.

Additional runs were made in the reactor of Fig. 1, the electrode terminals being as previously indicated, namely, nickel for the high frequency and brass for the low frequency, at wave lengths varying from about 20 to about 170 meters and within this range there was found, as indicated in Fig. 5, the three bands A, B and C, within each of which there was obtained a peak yield. The "A" band ranged from about 20 to about 45 meters and more specifically from about 30 to about 42 meters. The band "B" ranged from about 60 to about 85 meters and more specifically from 70 to 75 meters. The band "C" ranged from about 110 to 170 meters but more specifically from about 125 to about 135 meters.

The graph of Fig. 5 was obtained by operating as in Examples I and II, the only significant factor varied being the frequency as measured in meters wave length. Within the range of 20 to 170 meters, a run was made at intervals of 2 or 3 meters along the abscissa. The results of this series of experiments are plotted as the curve in Fig. 5.

It is desired to point out the following considerations:

(1) The true yields based on actual energy consumed at the arc are uniformly much higher than above indicated, as yields were calculated on the power amplifier plate energy instead of the much lower energy consumed at the discharge. This, however, is unimportant as the relative yields are correct and bring out the important facts relating to the existence of specific bands wherein the yield is greatly increased.

(2) The line M—N drawn through the low points is known as the base line. The line M—N may be defined as a line drawn through the points of minimum yield that lie between peaks.

(3) It will be noted that the top of each peak band is a jagged curve. This is intended to indicate that under the conditions of the experiment, yields could not be obtained toward the center of the bands with the nickel electrodes used due to the fact that at these points the electrodes melted producing globular tips, the yields from which could no longer be compared with the yields from sharp points. Subsequent work indicated that this may be avoided by maintaining the electrodes in a cold state.

(4) The highest point that could be reached as the curves were developed up each side of each peak lay approximately on the line R—S. In other words, where the line R—S crossed each side of each peak, at that point the nickel electrodes begin to melt.

Utilizing the apparatus of Fig. 1, nitrogen may be oxidized to nitrogen oxide from a gaseous mixture of nitrogen-and-oxygen-containing gases as, for example, air, and operating with a crossed luminous electrical discharge produced by any of the herein set forth critical gas reaction frequencies or the critical gas reaction wave lengths, said discharge being crossed with a second luminous discharge having a frequency or an energy content equivalent to that present in a sinusoidal wave length within a wave band width varying between 30,000,000 meters and 6,000 meters, the electrodes being maintained in a cold state whereby melting of the electrodes is prevented, the electrodes or the electrode terminals being selected from the group consisting of a metal-containing material in which copper predominates and a metal-containing material in which nickel predominates, said metal-containing electrode materials being simultaneously used; at least two of said electrodes being high potential electrodes, said assemblage of electrodes being positioned to have a cyclic electrical discharge pass between a pair thereof, one of said pair being a low potential electrode, or all of said electrodes or electrode terminals consisting of a metal-containing material in which copper predominates or all of the electrodes including 4-electrode system, being a metal-containing material in which nickel predominates, and yields obtained are indicated in dotted lines in Fig. 5 for critical gas reaction frequencies selected from a sinusoidal wave within the wave band width varying between 30 and about 42 meters; and about 70 and 75 meters.

The air which is introduced into the reactor 1 is dried prior to its introduction into the reaction vessel by passing it through the soda lime tube A of Fig. 4, then through the silica gel tube B, thence through the conduit C, through the orifice D of the differential manometer E, through the valve F, and thence to the reactor 1. At the point H is connected the mercury manometer G which measures the internal pressure of the reactor. From the reactor 1 the exit gases pass through exit conduit 27 to the balloon flask T, thence through the caustic soda absorbers J. The balloon flask T allows an ample time interval in which the nitric oxide is converted to nitrogen dioxide by the excess oxygen present. The nitrogen dioxide is absorbed in the caustic soda absorbers which have previously been charged with an accurately measured amount of standard caustic soda. The nitrogen dioxide reacts with the caustic soda to form sodium nitrate and sodium nitrite neutralizing a portion of the caustic soda. The excess caustic soda at the end of the run is titrated with standard acid and from the data thus obtained, the amount of nitric oxide formed in the discharge and calculated as nitric acid is readily obtained. A slight vacuum is obtained by means of the vacuum pump K and the amount of the vacuum adjusted by means of the release valve L and the main valve F in the supply line to insure a rate of flow of air through the system that is desired. The soda lime in A functions not only to take out a portion of the moisture but also to extract from the air substantially all of the carbon dioxide. The air as delivered to the reactor has a moisture content of about 5 to 8 mg. of moisture per liter. When the run is stated, the valves $V^2$ and P are closed and $V^1$ and O are open. When operation has reached equilibrium, valves $V^2$ and P are quickly opened and valves $V^1$ and O are closed, noting the time of doing so with a stop-watch. Upon conclusion of the run, valves $V^1$ and O are opened, while $V^2$ and P are closed.

The time interval during which the valves $V^2$ and P are open to the absorbers and the valves $V^1$ and O of the by-pass are closed was 1.67 minutes in Example I above and 6 minutes in Example II. During this period the caustic soda absorbers are absorbing the product produced by the reaction.

The low frequency energy herein set forth may vary from the lowest producible frequency and include 10, 25, 50, 60, 100, 250; 1,000; 5,000; 10,000; 20,000; 30,000; 40,000 and 50,000 cycles. It is desired to point out that 30,000,000 meters corresponds to 10 cycles and 6,000 meters corresponds to 50,000 cycles.

It is desired to point out that throughout the work on which Fig. 5 is based, the percentage of high frequency energy contributed to the crossed discharges approximated 8 to 10%. However, maximum yield of product per kilowatt hour is obtained when the high frequency energy contributed to the crossed discharge varies from 35% to 65% of the total energy, satisfactory results being obtained when the high frequency energy averages 50%. Hence, had this fact been known at the time of this work, the yields herein specifically set forth would have been still further increased by increasing the percentage of high frequency energy contributed to the crossed discharges from about 9% up to about 35% to 65%.

Accordingly, the invention in its improved form resides specifically in producing nitric oxide by subjecting a nitrogen-containing gas, such as air or its equivalent, to the action of crossed electrical discharges generated by electrodes provided with nickel-containing terminals crossed with electrodes provided with copper-containing terminals, or all the electrode terminals being a nickel-containing material, or all being a copper-containing material, the character of these terminals all having been specifically hereinbefore set forth, the high frequency cyclic energy which is crossed with the low frequency energy comprising from 10% to 45%, and preferably 50% of the total energy supplied to both the low frequency and the high frequency discharge, or other form of discharge, whereby the yield of nitric oxide is greatly increased. Not only may nitric acid be produced utilizing crossed electrodes, one of which at least has a nickel-containing terminal and one of which at least has a copper-containing terminal, all of the character herein specifically set forth, but other materials may be electrically transformed by supplying to a reactor equipped with said crossed electrodes high frequency and low frequency cyclic energy of the character herein specifically set forth, the energy contributed by the high frequency component varying between 4% and 65% of the total energy supplied to the crossed discharge. Preferably the energy contributed by the high frequency component during the reaction period varies from 35% to 65% to thereby greatly increase the yield of the electrochemically transformed product. Any of the compounds herein set forth may be reacted or any of the generic chemical reactions herein set forth caused to occur under the above conditions to greatly increase the yield. In short, the yield of any chemical compound may be increased by using a combination of nickel-containing and copper-containing crossed electrodes, as herein set forth, and increasing the percentage of high frequency energy supplied during the reaction to between 35% to 65 of the total energy supplied to both the low frequency and the high frequency discharges, and simultaneously water cooling the electrodes.

It is desired to point out that by crossing low frequency and high frequency discharges, the volume of the visible composite discharge per unit of total energy supplied is greatly increased; that is, the energy density in watts per cubic centimeter is greatly decreased. Stated differently, the composite discharge fills a larger volume than either discharge alone when supplied with energy equal to the total energy supplied to the crossed discharges.

As shown in Fig. 1, the crossed electrodes are all in the same plane, and said plane may be a vertical plane, a horizontal plane, or any intermediate plane. It is within the province of the present invention in its broad aspects to supplement the four electrodes, as shown in Fig. 1, by an additional pair of electrodes. The additional pair of electrodes may utilize the same low frequency energy as that passing through the electrodes 20 and 21; or the additional pair of electrodes may utilize the same frequency energy as that passing through the electrodes 24 and 25; or the additional pair of electrodes may use a lower frequency than that passing between electrodes 20 and 21 or a frequency intermediate between that passing through 20 to 21 and 24 to 25. The electrodes may be positioned at right angles to each other.

It is within the province of the present invention to carry out the reactions herein set forth using sub-atmospheric pressure, atmospheric pressure, or super-atmospheric pressure.

In producing nitric oxide, the air may be enriched with oxygen, and, within limits, the yield will be somewhat increased over the yield of nitric oxide produced when only air is electrically transformed in accordance with the present invention. Air may be enriched so that it has up to 50% of oxygen, and when so enriched this enrichment will produce an increase in yield of nitric acid of about 10%.

Fig. 6 sets forth the hook-up of the high frequency generator unit used for producing the high frequency energy supplied to the tank circuit connecting the generator to the reactor. The diagram may be divided into four circuits 32, 33, 34 and 35. Circuit 32 is the full wave rectification unit wherein the leads 36 connect to the 110-volt 60-cycle supply on the panel board. The numeral 37 identifies a transformer delivering its secondary high voltage current to the two rectification tubes 38, the filaments of which are heated by current generated in the filament transformer 39. The resistor 41 and fixed condenser 42, together with the choke coil 40, constitute a filter. The high voltage D. C. current produced by this circuit leaves same by means of the ground connection 43 and the lead 44, which delivers to the plates of tubes 45 and 46 of the oscillator circuit. The transformer 47, connected with 110-volt supply, provides the filament power for the tubes 45 and 46. The desired frequency is obtained by means of tuning the oscillator circuit 33, such tuning being effected by operation of the variable condenser 48 and the inductance 49.

In carrying out the work described as above set forth between the limits of wave length of 20 meters or 15 mc., and 175 to 180 meters or 1.71 to 1.66 mc., it is necessary to change the size of the inductance 49 by steps. This is done by removing one inductance and replacing same with another inductance having the desired characteristics. The minor circuit 50 is a coupling circuit, coupling the oscillator circuit 33 to the grid input circuit 51 of the power amplifier circuit 34. The grid circuit of the power amplifier is tuned by means of the variable condenser 52 and by changing inductance coils 51 in a manner similar to the change effected in inductance 49, as necessary to meet requirements. The combination of resistor 53 and condenser 54, both of which are grounded, serves to minimize or eliminate parasitic oscillations that might render the output less monochromatic. The resistor 55 provides grid bias for the power amplifier tubes 56 and 57. Transformer 58 provides power for the filaments of the power tubes 56 and 57. These tubes amplify power provided by circuit 35, imparting thereto the frequency developed by oscillator tubes 45 and 46. Transformer 59, connected with a 110-volt supply, provides the energy to the power supply rectification tubes 60 and 61. Transformer 62, also connected with a 110-volt supply, provides the power for the filaments of tubes 60 and 61. It will be observed that circuit 35 is essentially similar to circuit 32. The combination of the choke 63, fixed condenser 64, and resistor 65 constitutes a filter. The rectified power leaves the circuit via the milliammeter 66 to ground and lead 67 to the power amplifier circuit 34. The voltage at which it is delivered is measured by the voltmeter 68. The power amplifier circuit 34 is tuned to the desired frequency as generated by means of oscillator tubes 45 and 46 of oscillator circuit 33 by means of the variable condenser 69 and the inductance 70. The inductance 70 is varied by means of changing coils to meet various wave length requirements as is done in the case of inductances 49 and 51. The power amplifier circuit 34 thus tuned and supplied by D. C. power from circuit 35 transmits the amplified high frequency energy to the coupling circuit 71, which in turn delivers it to a tank circuit such as is shown in Fig. 7.

Fig. 7 represents a tank circuit of the type known as end grounded. The portion of the coupling circuit shown as 72 leads to and is a part of the coupling circuit 71 of Fig. 6 and it is placed at the end of the inductance 73. It will be noted that in this type of tank circuit the ground 74 is at the end of the tank coil 73 instead of in the middle 75, as would be the case had the tank circuit been of the center grounded type. The coupling circuit 71—72 serves merely to transfer the high frequency energy from the generator set to the tank circuit proper. The point 76 is the location of the discharge. Tuning of this tank circuit to the generator circuit is carried out by use of the variable condenser 77 and by changing inductance coil 73 as was done with inductances 70, 51 and 49 to meet requirements. The circuit conductors 78 are preferably of copper tubing. A thermo-milliammeter is located at 79 and a high frequency voltmeter at 80. The circuit is grounded at 74.

In the examples herein set forth, the rate of flow of air through the reactor varies from about 500 to 550 cc. per minute. It is important, in connection with the rate of air passing through the reactor vessel, to supply sufficient air per minute, so that the maximum yield for the frequency used may be obtained. This means that, operating with different high frequencies, varying minimum rates of flow are required in accordance with the frequency used. When the crossed discharge method is used to electrically transform products, the rate of flow of the material which is flowing through the reactor, which is to be transformed, must be greatly increased for frequencies corresponding with peak yields; and the rate of flow of about 500 to 550 cc. per minute represents the proper accelerated rate of flow of the air through the reactor to provide peak yields at the preferred peak frequency bands herein set forth.

While in carrying out the present invention it is stated that the low frequency electrodes are brass and the high frequency electrodes or electrode terminals are nickel, it is within the province of the present invention to use as the low frequency electrodes or electrode terminals copper, bronze, copper-lithium alloys, or the like, and such electrodes or electrode terminals may be defined by the generic expression "copper-containing electrodes or electrode terminals in which the copper predominates," the copper content being at least 60% or so. The brass terminals herein referred to used in carrying out the present invention are composed of ordinary yellow brass of 67% copper and 33% zinc. Other brasses may be used having 90% copper and 10% zinc. The zinc may be replaced by a small percentage of tin, and in that case the alloy may be properly termed bronze.

The discharge produced in accordance with the present invention is a composite discharge formed from a plurality of separate cyclic electrical discharges, each of which emanates from a separate high potential electrode terminal, the resultant composite discharge produced by the crossing, intersecting or intermingling of the separate luminous electrical discharges having a definite boundary or boundaries which are normally spaced from the walls of the reactor. In the best form of the invention, the composite visible discharge has a volume larger than the volume of either discharge alone when the total energy to generate either of the discharges is equal to the total energy supplied to produce the crossed and intersecting discharges. That separate crossing or intersecting or intermingling discharges function to form a composite discharge is shown by the fact that there is present in the reactor a plurality of electrical force fields, each discharge contributing its own separate electrical force field as a component of the resultant electrical force field. It is the resultant of these electrical force fields acting on the charged particles of the gaseous medium which produces the composite crossed discharge.

While the cyclic energy is stated to be supplied to the high frequency electrodes at a voltage of about 800 volts and to the low frequency electrodes at about 1100 volts, it is desired to point out that this is merely illustrative and not by way of limitation, as the voltages of the respective cyclic energies will vary in accordance with a number of conditions, including the length of discharge desired, the pressure used, the composition of the gas being reacted, and the composition of the electrodes utilized in carrying out the invention. In a fairly good sized reactor capable of at least semi-commercial exploitation, the voltages of both frequencies will vary from 5,000 to 10,000 volts, and preferably from 5,000 to 7,000 volts, the electrode gap between the electrodes may be in the neighborhood of 1 to 5 inches, and preferably 1 to 3 inches. Here again, these figures are merely illustrative and are set forth to indicate that the voltage may be varied over wide limits depending upon the conditions of operation.

By "radio frequency" as used above is meant a frequency ranging from 300,000 cycles to 600 mc. and more usually 500,000 cycles to 60 mc.

While, in carrying out the present invention, it has been stated that the high frequency electrodes or electrode terminals are nickel, it is within the province of the present invention to use nickel alloys as the high frequency electrodes or electrode terminals provided the nickel is present in the alloy in a predominating quantity, that is, over 50%, and preferably the nickel content is around 90%, although it may be 60% to 90%. The nickel alloy terminal may comprise a nickel-copper alloy, as, for example, 90% nickel and 10% copper, or 80% nickel and 20% copper. The nickel-copper alloy may have present any amount of copper varying between 0 and 40%, as, for example, 60% nickel and 40% copper alloy. Not only may the nickel be alloyed with one metal, as for example, copper, but the nickel may be alloyed with a plurality of minor alloying constituents, as, for example, copper and chromium.

Instead of employing the reactor herein set forth, the reactor may be of the character disclosed in copending application Serial No. 490,904, now Patent No. 2,468,175, granted April 26, 1949, wherein the reactor is provided with crossed electrodes, one of said electrodes being a common ground electrode through which both of the crossed discharges pass to the ground. A reactor of this character may be provided with low frequency, nickel-containing electrodes of the kind referred to, and the common electrode may be a copper-containing electrode of the specific character herein referred to, or vice versa. If a high frequency discharge is passed through a nickel-containing electrode, the low frequency discharge is passed through the copper-containing electrode, and vice versa. The common electrode may be either a copper-containing or a nickel-containing electrode.

It is also within the province of the present invention to utilize a reactor of the character set forth in copending application Serial No. 485,058, now Patent No. 2,468,173, granted April 26, 1949, wherein an external electrode is provided.

The present application is a continuation in part of application Serial No. 502,021, filed September 11, 1943, now abandoned, the latter application being a continuation-in-part of abandoned application Serial No. 483,931, filed April 21, 1943. The present application is also a continuation in part of each of the following applications: Serial No. 489,828, filed June 5, 1943, Production of nitrogen oxide; Serial No. 553,426, filed September 9, 1944, Electrochemical transformation of gaseous material; Serial No. 779,561, filed October 13, 1947, Electrochemical production of chemical entities utilizing high frequency discharges, and Serial No. 790,568, filed December 9, 1947, Method of and apparatus for electrochemically producing nitrogen oxide in the presence of tantalum electrodes.

The yields that are herein set forth are predicated on a power factor of 1.00.

It is well known that a specific sinusoidal wave or frequency has a definite energy quantum content, and that, given the particular frequency or the particular wave length employed, the energy quantum or the energy content thereof may be easily calculated.

In order to convert a given frequency into its equivalent quantum energy all that is necessary is to multiply the given frequency by Planck's constant, which is $6.554 \times 10^{-27}$ erg-seconds.

The relationship between energy quantum expressed in ergs, frequency and wave length is set forth by the following formula:

$$E \text{ (ergs)} = hf = \frac{k}{\lambda}$$

where
$k = 1.967 \times 10^{-18}$
$h =$ Planck's constant
$f =$ frequency
$\lambda =$ wave length in meters said interrelationship being well known in the literature, and is also set forth in said co-pending application Serial No. 790,568.

The constant "$k$" is merely the quantum energy of 300 mc. (1 meter) sinusoidal wave and is obtained in the usual manner by multiplying Planck's constant $(6.554 \times 10^{-27})$ by 300 mc. $(3 \times 10^8)$, the resulting figure being $1.967 \times 10^{-18}$.

In order that wave lengths in meters may be expressed in equivalent frequencies, the following table is set forth:

*Conversion table*

| Meters | Equivalent Frequency |
|---|---|
| 20 | 15.00 mc. |
| 30 | 10.00 mc. |
| 40 | 7.50 mc. |
| 42 | 7.14 mc. |
| 45 | 6.67 mc. |
| 70 | 4.29 mc. |
| 75 | 4.00 mc. |
| 110 | 2.73 mc. |
| 125 | 2.40 mc. |
| 135 | 2.22 mc. |
| 170 | 1.76 mc. |
| 6,000 | 50.00 kc. |
| 30,000,000 | 10 cycles. |

Referring to the above table, the product of wave lengths in meters and frequency in megacycles is always equal to 300. Therefore, given the wave length in meters, the equivalent frequency may be readily calculated by dividing 300 by the wave length in meters and the equivalent will be frequency in megacycles. For example, in order to convert 20 meters to the corresponding frequency, 300 is divided by 20 and the result is 15 mc.

The present invention is directed to a method of producing nitrogen oxide comprising introducing a gaseous medium consisting principally of nitrogen gas and oxygen gas into a gas discharge apparatus, having electrodes disposed therein to produce cyclic electrical discharges which cross each other, the electrodes present in said cross discharge apparatus consisting of a metal-containing material in which copper predominates or a metal-containing material in which nickel predominates. The gaseous medium is thereafter subjected to a composite discharge produced by the intersection of two separate discharges, one of said discharges being generated by cyclic electrical energy quantum equivalent to a sinusoidal frequency between about 10 mc. (30 meters) and about 7.14 mc. (42 meters), or the discharge may be generated by a cyclic electrical energy quantum equivalent to a sinusoidal frequency between about 4.29 mc. (70 meters) and about 4.00 mc. (75 meters). The utilization of these critical wave bands or equivalent wave bands in the production of nitrogen oxide irrespective of the electrodes used is claimed in co-pending application Serial No. 553,426, filed September 9, 1944.

The cross discharge apparatus herein set forth and related embodiments thereof are claimed in U. S. Patents Nos. 2,468,173, 2,468,174, and 2,468,175, granted April 26 1949.

I claim:

1. The method of producing nitrogen oxide comprising introducing a gaseous medium consisting principally of nitrogen gas and oxygen gas into a gas discharge apparatus having an assemblage of at least three separately spaced electrodes provided with metallic electrode terminals selected from the group consisting of a metal-containing material in which copper predominates and a metal-containing material in which nickel predominates at least two of said electrode terminals being high potential electrode terminals, said assemblage of electrode terminals being positioned to have a cyclic electrical discharge pass between a pair thereof, one of said pair being a low potential electrode terminal, subjecting said gaseous medium simultaneously to a plurality of separate cyclic electrical discharges, each of which emanates from a separate high potential electrode terminal, said discharges intersecting to form a composite discharge, one of said discharges being generated by cyclic electrical energy quantum equivalent to a sinusoidal frequency between about 10 mc. (30 meters) and about 7.14 mc. (42 meters), and the other discharge being generated by a cyclic electrical energy quantum equivalent to a sinusoidal frequency between about 10 cycles (30,000,000 meters) and about 50,000 cycles (6,000 meters).

2. The method of claim 1 in which the discharge is a luminous discharge.

3. The method of producing nitrogen oxide comprising introducing a gaseous medium consisting principally of nitrogen gas and oxygen gas into a gas discharge apparatus having an assemblage of at least three separately spaced electrodes provided with metallic electrode terminals selected from the group consisting of a metal-containing material in which copper predominates and a metal-containing material in which nickel predominates, at least two of said electrode terminals being high potential electrode terminals, said assemblage of electrode terminals being positioned to have a cyclic electrical discharge pass between a pair thereof, one of said pair being a low potential electrode terminal, subjecting said gaseous medium simultaneously to a plurality of separate cyclic electrical discharges, each of which emanates from a separate high potential electrode terminal, said discharges intersecting to form a composite discharge, one of said discharges being generated by cyclic electrical energy quantum equivalent to a sinusoidal frequency between about 4.29 mc. (70 meters) and about 4.00 mc. (75 meters), and the other discharge being generated by a cyclic electrical energy quantum equivalent to a sinusoidal frequency between about 10 cycles (30,000,000 meters) and about 50,000 cycles (6,000 meters).

4. The method of producing nitrogen oxide comprising introducing a gaseous medium consisting principally of nitrogen gas and oxygen gas into a gas discharge apparatus having an assemblage of at least three separately spaced electrodes provided with metallic electrode terminals selected from the group consisting of a metal-containing material in which copper predominates and a metal-containing material in which nickel predominates, at least two of said electrode terminals being high potential electrode terminals, said assemblage of electrode terminals being positioned to have a cyclic electrical discharge pass between a pair thereof, one of said pair being a low potential electrode terminal, subjecting said gaseous medium simultaneously to a plurality of separate cyclic electrical discharges, each of which emanates from a separate high potential electrode terminal, said discharges intersecting to form a composite visible discharge having a volume larger than the volume of either discharge alone when the total energy to generate either of said discharges is equal to the total energy supplied to produce the crossed and intersecting discharges, one of said discharges being generated by cyclic electrical energy quantum equivalent to a sinusoidal frequency between about 10 mc. (30 meters) and about 7.14 mc. (42 meters), and the other discharge being generated by a cyclic electrical energy quantum equivalent to a sinusoidal frequency between about 10 cycles (30,000,000 meters) and about 50,000 cycles (6,000 meters), the amount of the higher frequency energy supplied to the electrode terminals being at least 10% of the total energy supplied to the electrode terminals.

5. The method of producing nitrogen oxide comprising introducing a gaseous medium consisting principally of nitrogen gas and oxygen gas into a gas discharge apparatus having an assemblage of at least three separately spaced electrodes provided with metallic electrode terminals selected from the group consisting of a metal-containing material in which copper predominates and a metal-containing material in which nickel predominates, at least two of said electrode terminals being high potential electrode terminals, said assemblage of electrode terminals being positioned to have a cyclic electrical discharge pass between a pair thereof, one of said pair being a low potential electrode terminal, subjecting said gaseous medium simultaneously to a plurality of separate cyclic electrical discharges, each of which emanates from a separate high potential electrode terminal, said discharges intersecting to form a composite visible discharge having a volume larger than the volume of either discharge alone when the total energy to generate either of said discharges is equal to the total energy supplied to produce the crossed and intersecting discharges, one of said discharges being generated by cyclic electrical energy quantum equivalent to a sinusoidal frequency between about 4.29 mc. (70 meters) and about 4.00 mc. (75 meters), and the other discharge being generated by a cyclic electrical energy quantum equivalent to a sinusoidal frequency between about 10 cycles (30,000,000 meters) and about 50,000 cycles (6,000 meters), the amount of the higher frequency energy supplied to the electrode terminals being at least 10% of the total energy supplied to the electrode terminals.

6. The method of producing nitrogen oxide comprising introducing a gaseous medium consisting principally of nitrogen gas and oxygen gas into a gas discharge apparatus having a plurality of pairs of separately spaced electrodes provided with metallic electrode terminals, one of said pairs of electrode terminals having as its predominating electrode component a metal-containing material in which copper predominates and the other of said pairs of electrode terminals having as its predominating electrode terminal component a metal-containing material in which nickel predominates, each of said pairs of electrode terminals having a high potential electrode terminal, subjecting said gaseous medium to a plurality of separate cyclic electrical discharges each of which emanates from a high potential electrode terminal, said discharges intersecting to form a composite discharge, one of said discharges being generated by cyclic electrical energy quantum equivalent to a sinusoidal frequency between about 10 mc. (30 meters) and about 7.14 mc. (42 meters), and the other discharge being generated by a cyclic electrical energy quantum equivalent to a sinusoidal frequency between about 10 cycles (30,000,000 meters) and about 50,000 cycles (6,000 meters).

7. The method of producing nitrogen oxide comprising introducing a gaseous medium consisting principally of nitrogen gas and oxygen gas into a gas discharge apparatus having a plurality of pairs of separately spaced electrodes provided with metallic electrode terminals, one of said pairs of electrode terminals having as its predominating electrode terminal component a metal-containing material in which copper predominates and the other of said pairs of electrode terminals having as its predominating electrode terminal component a metal-containing material in which nickel predominates, each of said pairs of electrode terminals having a high potential electrode terminal, subjecting said gaseous medium to a plurality of separate cyclic electrical discharges each of which emanates from a high potential electrode terminal, said discharge intersecting to form a composite discharge, one of said discharges being generated by cyclic electrical energy quantum equivalent to a sinusoidal frequency between about 4.29 mc. (70 meters) and about 4.00 mc. (75 meters), and the other discharge being generated by a cyclic electrical energy quantum equivalent to a sinusoidal frequency between about 10 cycles (30,000,000 meters) and about 50,000 cycles (6,000 meters).

8. The method of producing nitrogen oxide comprising introducing a gaseous medium consisting principally of nitrogen gas and oxygen gas into a gas discharge apparatus having an assemblage of at least three separately spaced electrodes provided with metallic electrode terminals selected from the group consisting of a metal-containing material in which copper predominates and a metal-containing material in which nickel predominates, at least two of said electrode terminals being high potential electrode terminals, said assemblage of electrode terminals being positioned to have a cyclic electrical discharge pass between a pair thereof, one of said pair being a low potential electrode terminal, subjecting said gaseous medium simultaneously to a plurality of separate cyclic electrical discharges, each of which emanates from a separate high potential electrode terminal, said discharges intersecting to form a composite discharge, one of said discharges being generated by cyclic electrical energy quantum equivalent to a sinusoidal frequency between about 10 mc. (30 meters) and about 7.14 mc. (42 meters), and the other discharge being generated by a cyclic electrical energy quantum equivalent to a sinusoidal frequency between about 10 cycles (30,000,000 meters) and about 50,000 cycles (6,000 meters), the amount of the higher frequency energy supplied to the electrode terminals being at least 10% of the total energy supplied to the electrode terminals.

9. The method of producing nitrogen oxide comprising introducing a gaseous medium consisting principally of nitrogen gas and oxygen gas into a gas discharge apparatus having an assemblage of at least three separately spaced electrodes provided with metallic electrode terminals selected from the group consisting of a metal-containing material in which copper predominates and a metal-containing material in which nickel predominates, at least two of said electrode terminals being high potential electrode terminals, said assemblage of electrode terminals being positioned to have a cyclic electrical discharge pass between a pair thereof, one of said pair being a low potential electrode terminal, subjecting said gaseous medium simultaneously to a plurality of separate cyclic electrical discharges, each of which emanates from a separate high potential electrode terminal, said discharges intersecting to form a composite discharge, one of said discharges being generated by cyclic electrical energy quantum equivalent to a sinusoidal frequency selected from the group of frequencies between about 10 mc. (30 meters) and about 7.14 mc. (42 meters); and between about 4.29 mc. (70 meters) and about 4.00 mc. (75 meters).

10. The method of producing nitrogen oxide comprising introducing a gaseous medium consisting principally of nitrogen gas and oxygen gas into a gas discharge apparatus having a plurality of pairs of separately spaced electrodes provided with metallic electrode terminals, one of said pairs of electrode terminals having as its predominating electrode terminal component a metal-containing material in which copper predominates and the other of said pairs of electrode terminals having as its predominating electrode terminal component a metal-containing material in which nickel predominates, each of said pairs of electrode terminals having a high potential electrode terminal, subjecting said gaseous medium to a plurality of luminous separate cyclic electrical discharges each of which emanates from a high potential electrode terminal, said discharges intersecting to form a composite discharge, one of said discharges being generated by cyclic electrical energy quantum equivalent to a sinusoidal frequency selected from the group of frequencies between about 10 mc. (30 meters) and about 7.14 mc. (42 meters); and between about 4.29 mc. (70 meters) and about 4.00 mc. (75 meters).

11. The method of producing nitrogen oxide comprising introducing a gaseous medium consisting principally of nitrogen gas and oxygen gas into a gas discharge apparatus provided with a plurality of spaced electrodes disposed in the apparatus to supply the apparatus with a plurality of cyclic electrical discharges having different energy quanta, said electrodes consisting of a metal-containing material in which nickel predominates, and subjecting said gaseous material in the presence of said electrodes to the action of a plurality of separate cyclic electrical discharges, said discharges intersecting to form a composite discharge, one of said discharges being generated by a cyclic electrical energy quantum equivalent to a sinusoidal frequency between 34 meters and 40 meters.

12. The method of producing nitrogen oxide comprising introducing a gaseous medium consisting principally of nitrogen gas and oxygen gas into a gas discharge apparatus having a plurality of pairs of separately spaced electrodes provided with metallic electrode terminals, one of said pairs of electrode terminals having as its predominating electrode terminal component a metal-containing material in which copper predominates and the other of said pairs of electrode terminals having as its predominating electrode terminal component a metal-containing material in which nickel predominates, each of said pairs of electrode terminals having a high potential electrode terminal, subjecting said gaseous medium to a plurality of separate cyclic electrical discharges each of which emanates from a high potential electrode terminal, said discharges intersecting to form a composite discharge, one of said discharges being generated by cyclic electrical energy quantum equivalent to a sinusoidal frequency selected from the group of frequencies between about 10 mc. (30 meters) and about 7.14 mc. (42 meters); and between about 4.29 mc. (70 meters) and about 4.00 mc. (75 meters).

13. The method of producing nitrogen oxide comprising introducing a gaseous medium consisting principally of nitrogen gas and oxygen gas into a gas discharge apparatus provided with metallic electrodes comprising a metal-containing material in which nickel predominates, and subjecting said gaseous medium to a cyclic electrical discharge generated by cyclic electrical energy quantum equivalent to a sinusoidal frequency between about 8.82 mc. (34 meters) and about 7.5 mc. (40 meters).

14. The method of producing nitrogen oxide comprising introducing a gaseous medium consisting principally of nitrogen gas and oxygen gas into a gas discharge apparatus provided with metallic electrodes comprising a metal-containing material in which copper predominates, and subjecting said gaseous medium to a cyclic electrical discharge generated by cyclic electrical energy quantum equivalent to a sinusoidal frequency between about 8.82 mc. (34 meters) and about 7.5 mc. (40 meters).

15. The method of producing nitrogen oxide comprising introducing a gaseous medium consisting principally of nitrogen gas and oxygen gas into a gas discharge apparatus provided with metallic electrodes comprising a metal-containing material in which nickel predominates, and subjecting said gaseous medium to a cyclic electrical discharge generated by cyclic electrical energy quantum equivalent to a sinusoidal frequency between about 4.29 mc. (70 meters) and about 4.00 mc. (75 meters).

16. The method of producing nitrogen oxide comprising introducing a gaseous medium consisting principally of nitrogen gas and oxygen gas into a gas discharge apparatus provided with metallic electrodes comprising a metal-containing material in which copper predominates, and subjecting said gaseous medium to a cyclic electrical discharge generated by cyclic electrical energy quantum equivalent to a sinusoidal frequency between about 4.29 mc. (70 meters) and about 4.00 mc. (75 meters).

WILLIAM J. COTTON.

REFERENCES CITED

The following references are of record in the file of this patent:

UNITED STATES PATENTS

| Number | Name | Date |
|---|---|---|
| 578,685 | Whitney | Mar. 9, 1897 |
| 1,198,116 | Doule | Sept. 12, 1916 |
| 1,291,660 | Summers | Jan. 14, 1919 |
| 1,458,525 | Daniels et al. | June 12, 1923 |
| 1,601,500 | Island | Sept. 28, 1926 |
| 2,089,966 | Kassner | Aug. 17, 1937 |
| 2,106,780 | Whittier | Feb. 1, 1938 |
| 2,134,206 | Roberts | Oct. 25, 1938 |
| 2,257,177 | Luster | Sept. 30, 1941 |

FOREIGN PATENTS

| Number | Country | Date |
|---|---|---|
| 12,541 | Great Britain | 1904 |
| 315,367 | Great Britain | Oct. 9, 1930 |
| 354,736 | Great Britain | Aug. 6, 1931 |
| 400,431 | Great Britain | Oct. 26, 1933 |